(No Model.)
G. LATZ.
SAFETY CAR FENDER.
No. 514,234. Patented Feb. 6, 1894.
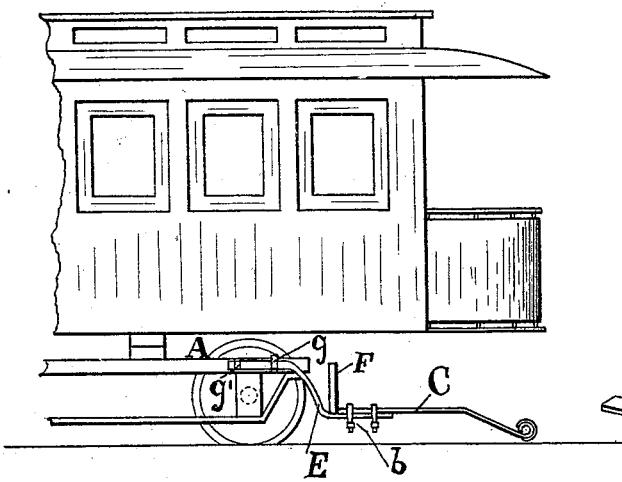
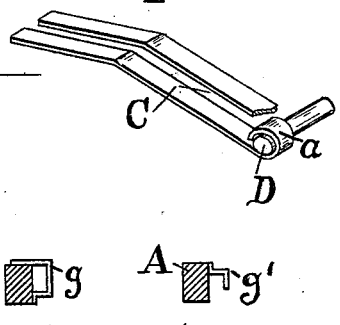
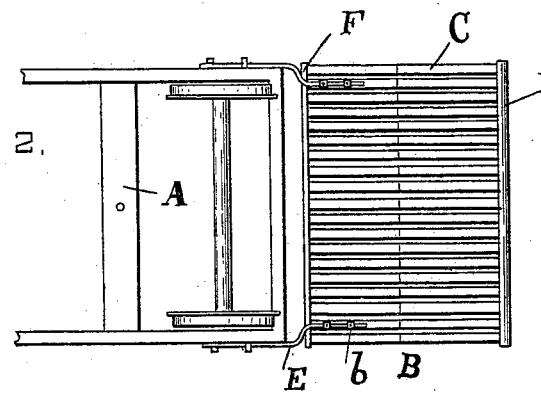
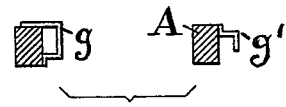
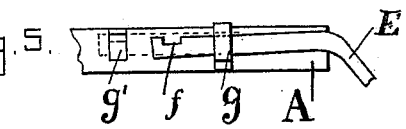
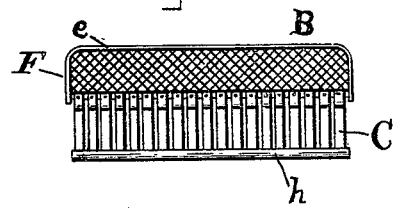
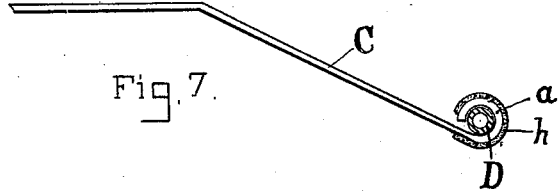
WITNESSES:
L. Ismy Van Horn.
Chas. B. Mann Jr.
INVENTOR:
George Latz
By Chas B. Mann
ATTORNEY.

UNITED STATES PATENT OFFICE.

GEORGE LATZ, OF BALTIMORE, MARYLAND.

SAFETY CAR-FENDER.

SPECIFICATION forming part of Letters Patent No. 514,234, dated February 6, 1894.

Application filed August 24, 1893. Serial No. 483,894. (No model.)

*To all whom it may concern:*

Be it known that I, GEORGE LATZ, a citizen of the United States, residing at Baltimore, in the State of Maryland, have invented certain new and useful Improvements in Safety Car-Fenders, of which the following is a specification.

This invention relates to safety fenders for street cars, and has for its object to provide a fender which will pick-up a person in danger of being run over by the car and hold such person in a safe position until the car is stopped. The construction of fender is such that it can be removed at will and used at either end of the car, thus avoiding the expense of providing a fender for each end.

The invention consists in certain novel features of construction, combinations and arrangements of parts, hereinafter described and claimed.

In the accompanying drawings,—Figure 1 is a side elevation of a car provided with my improved safety fender. Fig. 2 is a bottom view of the car truck and the fender. Fig. 3 is a detail of a portion of the fender, showing the method of attaching the slats thereof to the forward horizontal bar. Fig. 4 is a detail of the receiving loop and catch for holding the removable fender in position upon the bars of the car truck. Fig. 5 is also a detail showing the method of attaching the supporting bars of the removable fender to the car truck,—the supporting bar being shown out of engagement with the rear or open catch. Fig. 6 is a front view of the fender, and Fig. 7 is a detail of one of the fender-slats and showing the cushion secured thereto.

The letter, A, designates a car truck frame to which my improved safety fender, B, is secured. The fender proper is constructed of a series of slats, C, made preferably of steel or other strong springy material. These slats near where they are secured to the truck-frame, A, are straight,—that is, on a horizontal plane. At or about the center of their length they are bent downward slightly so that their forward ends have an inclination toward the street, and at the end each slat is turned up or formed into an eye, $a$, which has position within an inch or two of the street surface. A bar or pipe, D, passes through these eyes and serves for connecting the slats.

An upright headboard or stop, F, is provided on the upper or inner part of the slats for the purpose of preventing the person, or other object, picked up by the fender, from falling backward under the truck of the car. This headboard is constructed with a wire frame or netting which is surrounded on its top and sides by a rod or edging, $e$, and is secured by its base to the fender.

The fender has a curved or bent rod, E, which is connected with it by bolts or clips, $b$. The rod, E, has on the upper edge of its free end a notch, $f$. On each side of the truck-frame is a loop, $g$, and an angularly-bent catch, $g'$. In attaching the fender to the car, the rods, E, are first passed through the loop, $g$, and the notched ends of the rods are then interlocked with the catch, $g'$, the weight of the fender normally holds the rods, E, in engagement. When it is desired to remove the fender from one end of the car and attach it to the other, the front of the fender is lifted which disengages the notches, $f$, of the rods from the catches, $g'$; the rods, E, are then withdrawn from the loop, $g$. The fender may then be attached to the other end of the car in the manner heretofore described.

The eyes, $a$, of the fender slats and the bar or pipe, D, are covered with rubber, cloth, leather, or other elastic material, $h$, to prevent the person picked-up by the fender being injured.

As the fender is attached to the frame of the car-truck where the latter is not affected by the springs, its position or height above the street is always the same.

Having thus described my invention, what I claim as new, and desire to secure by Letters Patent, is—

1. The combination with the truck-frame of a car, of a safety fender constructed with spaced slats the higher portion of which is placed horizontally and the lower portion projecting forwardly and downwardly-inclined with an eye at the lower end thereof; and a connecting bar which extends through the eyes of all the slats, as set forth.

2. The combination with the truck-frame of a car, of a removable safety fender constructed with spaced slats the higher portion of which is placed horizontally and the lower portion projecting forward and downwardly-inclined with an eye at the lower end thereof; a connecting bar which extends through the eyes of all the slats; two rods, E, attached to the fender and each provided on its upper edge with a notch $f$; and a loop, $g$, and an angular catch, $g'$, on the truck-frame, as set forth.

3. The combination with the truck-frame of a car, of a removable safety fender constructed with spaced slats the higher portion of which is placed horizontally and the lower portion projecting forward and downwardly-inclined with an eye at the lower end thereof; a headboard secured to the said higher portion of the slats; a connecting bar which extends through the eyes of all the slats; a covering of elastic material over the said eyes and connecting bar; two rods, E, attached to the fender and each provided on its upper edge with a notch, $f$; and a loop, $g$, and an angular catch, $g'$, on the truck-frame, as set forth.

In testimony whereof I affix my signature in the presence of two witnesses.

GEORGE LATZ.

Witnesses:
CHAS. B. MANN, Jr.,
C. C. HINES.